United States Patent [19]

Satran et al.

[11] Patent Number: 5,593,255

[45] Date of Patent: Jan. 14, 1997

[54] CUTTING INSERT FOR A ROTARY MILLING CUTTER

[75] Inventors: Amir Satran, Kfar Vradim; Rafael Margulis, Karmiel, both of Israel

[73] Assignee: Iscar Ltd., Migdal Tefen, Israel

[21] Appl. No.: 514,047

[22] Filed: Aug. 11, 1995

[30] Foreign Application Priority Data

Aug. 25, 1994 [IL] Israel ......................................... 110785

[51] Int. Cl.$^6$ ................................. B23C 5/22; B23C 5/10
[52] U.S. Cl. ............................................. 407/113; 407/116
[58] Field of Search ..................................... 407/113, 114, 407/115, 116, 117, 30, 42, 43, 44, 120

[56] References Cited

U.S. PATENT DOCUMENTS

| | | | |
|---|---|---|---|
| 3,848,303 | 11/1974 | Faber | 407/114 X |
| 4,214,847 | 7/1980 | Kraemer | 407/114 |
| 4,475,851 | 10/1984 | Hale | 407/114 X |
| 4,699,549 | 10/1987 | Shimomura et al. | 407/113 X |
| 4,755,086 | 7/1988 | Stashko | 407/114 |
| 5,052,863 | 10/1991 | Satran . | |
| 5,207,538 | 5/1993 | Satran | 407/116 X |

FOREIGN PATENT DOCUMENTS

| | | |
|---|---|---|
| 0239045 | 11/1990 | European Pat. Off. . |
| 0585800 | 3/1994 | European Pat. Off. . |
| 1177068 | 9/1985 | U.S.S.R. ................................. 407/120 |

*Primary Examiner*—M. Rachuba
*Assistant Examiner*—Henry W. H. Tsai
*Attorney, Agent, or Firm*—Pennie & Edmonds

[57] ABSTRACT

A cutting insert for a rotary cutter tool, said insert being of substantially parallelepipedal shape, having a pair of opposite, parallel, major cutting edges of length L and a pair of opposite subsidiary cutting edges, each subsidiary cutting edges being transversely directed with respect to the major cutting edges and comprising at least two successive, angularly disposed, component subsidiary cutting edges, a first component cutting edge of each subsidiary cutting edge merging, via a rounded nose portion, with an adjacent end of a major cutting edge and defining therewith an angle $\theta_1$ lying between 50°–70°, a further component cutting edge of each subsidiary cutting edge merging with an adjacent end of an opposite major cutting edge and defining therewith an angle $\theta_2$ lying between 20°–40°; the total projected lengths of the component subsidiary cutting edges of each subsidiary cutting edge being approximately 0.6 L.

13 Claims, 5 Drawing Sheets

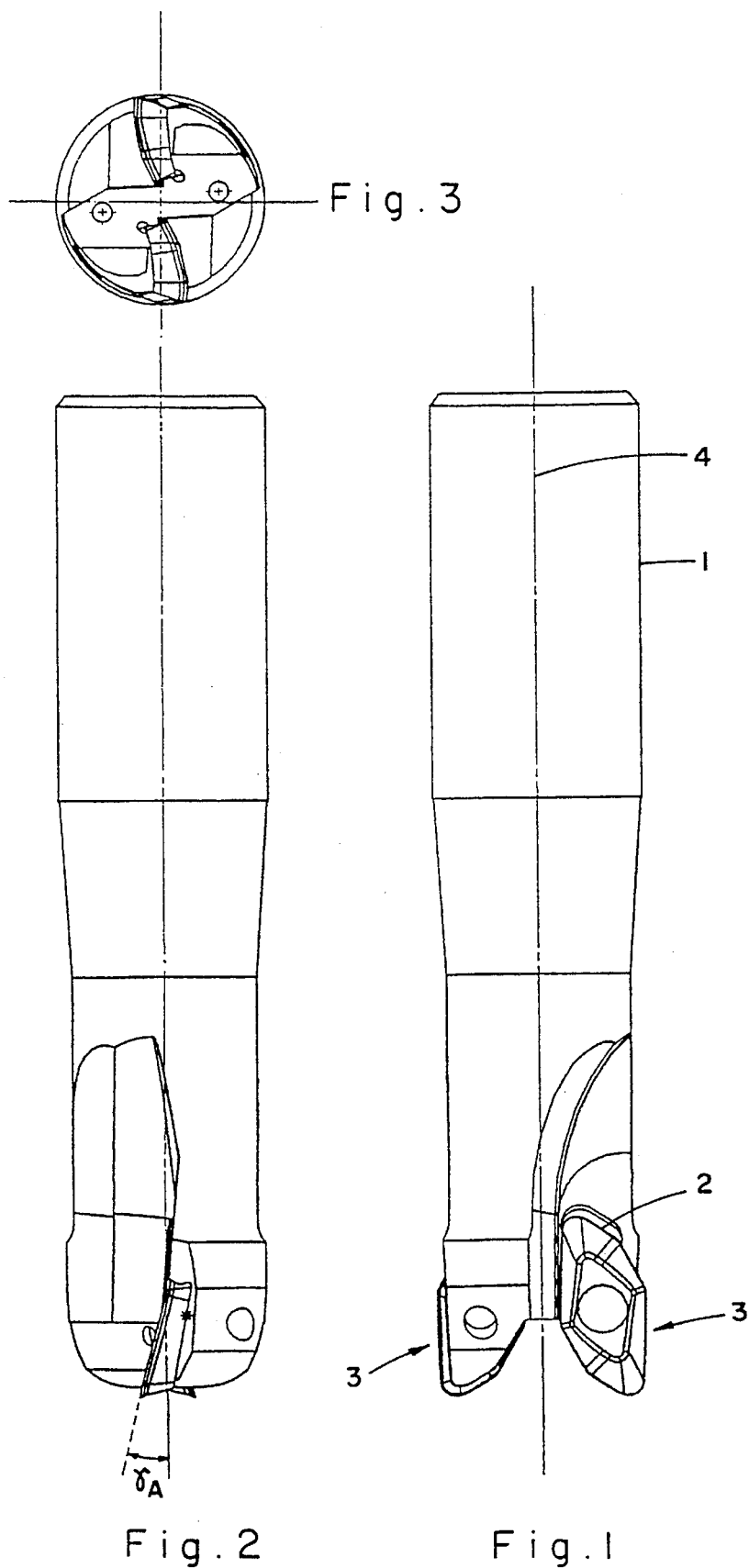

CUTTING INSERT FOR A ROTARY MILLING CUTTER

FIELD OF THE INVENTION

This invention relates to a cutting insert for a rotary milling cutter tool, and in particular for a rotary routing cutter tool.

BACKGROUND OF THE INVENTION

Routing cutter tools are employed in the machining of workpieces where it is required to remove from the workpiece substantial amounts of metal leaving precisely determined external contours, such as shoulders or recesses, in the machined workpiece. A particular example of such routing operations is in the machining of aircraft structural components such as, for example, wing structures, wherein it is required to reduce to a maximum degree the weight of the structure whilst ensuring its mechanical strength. For this purpose the workpiece, usually formed of aluminum, is subjected to compound end-milling operations including slotting and recess milling, adjacent recesses in the workpiece being very often separated by extremely thin-walled portions. It will therefore be appreciated that the routing operation involves the removal of considerable quantities of metal and production efficiency requires a relatively high rate of such metal removal. At the same time, and in view of the fact that there remain in the machined component very thin separating walls, it is vital to ensure that the routing operation involves a minimum degree of vibration, which could give rise to damage in these thin-walled portions, or induce undesirable stresses and strain therein.

Of its very nature, a routing operation involves an initial drilling or sinking penetration of the workpiece by the cutting insert in the direction of the rotary axis of the cutting tool, and a subsequent milling operation involving a relative transverse displacement of the workpiece with respect to the rotary axis of the cutter tool. It has been proposed in this connection, e.g. U.S. Pat. No. 4,946,318, to provide a rotary routing cutter tool having a cutting insert wherein the rotary axis of the cutter tool is offset with respect to the cutting insert.

A cutting insert, generally employed for this purpose, is of a substantially parallelepipedal shape, having a pair of substantially parallel major cutting edges of equal length and a pair of transversely directed, subsidiary cutting edges. Each subsidiary cutting edge merges at one end thereof with an adjacent major cutting edge via a rounded nose portion. At least a portion of each subsidiary cutting edge defines, with the adjacent major cutting edge, an acute angle. With such an insert, an axially directed movement of the tool into the workpiece, accompanied by rotation of the tool, results in the rounded nose portion and the subsidiary cutting edge of the insert effecting drilling or sinking. This is followed by a transverse displacement of the workpiece so as to route a slot in the workpiece and, to this end, the insert moves in a series of ramps as it reciprocates from one end of the slot to the other whilst being continuously displaced into the workpiece. In the course of these transverse displacements, the subsidiary cutting edge serves to remove the upstanding core of material which has been formed underneath the central portion of the cutting tool, whilst the major cutting edge serves to mill the surrounding slot wall.

In view of the fact that the rotary axis of the tool is radially offset with respect to the insert, the maximum depth of penetration of the tool into the workpiece is limited to the projected length of the subsidiary cutting edge on the adjacent major cutting edge. It will be realized that the more limited is the maximum penetration of the insert into the workpiece, the greater the number of ramps which have to be milled in order to attain the desired slot depth. Clearly, the greater the number of ramps that have to be milled, the more time consuming is the whole routing procedure.

It is an object of the present invention to provide a cutting insert for a rotary milling tool, particularly for a routing tool, wherein the above-referred to disadvantage is significantly reduced.

BRIEF SUMMARY OF THE INVENTION

According to the present invention, there is provided a cutting insert for a rotary cutter tool, said insert being of substantially parallelepipedal shape, having a pair of opposite, parallel, major cutting edges of length L and a pair of opposite subsidiary cutting edges, each subsidiary cutting edge being transversely directed with respect to the major cutting edges and comprising at least two successive, angularly disposed, component subsidiary cutting edges, a first component cutting edge of each subsidiary cutting edge merging, via a rounded nose portion, with an adjacent end of a major cutting edge and defining therewith an angle $\theta_1$ lying between 50°–70°, a further component cutting edge of each subsidiary cutting edge merging with an adjacent end of an opposite major cutting edge and defining therewith an angle $\theta_2$ lying between 20°–40°; the total projected lengths of the component subsidiary cutting edges of each set being approximately 0.6 L.

By virtue of the division of the subsidiary cutting edge into a plurality of successive cutting edges which are angularly disposed with respect to each other, the maximum depth of penetration of the insert into the workpiece corresponds to the total projected lengths of the component subsidiary cutting edges, i.e. approximately 0.6 L, and this depth is significantly greater than that which would be achieved with an insert of conventional design having a single, unitary subsidiary cutting edge. In consequence, routing or pocketing to a required depth can be achieved with a reduced number of transverse milling cycles (ramps) and this, in its turn, leads to a speedier pocketing process.

BRIEF SUMMARY OF THE DRAWINGS

For a better understanding of the present invention and to show how the same may be carried out in practice, there will now be described a cutting insert in accordance with the present invention, as well as a rotary cutting tool incorporating such an insert, with reference to the accompanying drawings in which:

FIG. 1 is a top view of a routing cutter tool incorporating a pair of cutting inserts in accordance with the present invention;

FIG. 2 is a side view of the routing cutter tool as shown in FIG. 1;

FIG. 3 is an end view of the tool shown in FIGS. 1 and 2;

DETAILED DESCRIPTION OF PREFERRED EMBODIMENT

A cutting insert according to the present invention is designed, preferably, for use in a routing cutter tool 1 such as shown in FIGS. 1, 2 and 3. As seen, the cutter tool 1 has, formed at a leading end thereof, diametrically opposed seatings 2, in which a pair of cutting inserts 3, in accordance with the present invention, are mounted. Such a cutting insert 3 will now be described in detail with reference to FIGS. 4 through 11 of the drawings.

Figure 4:
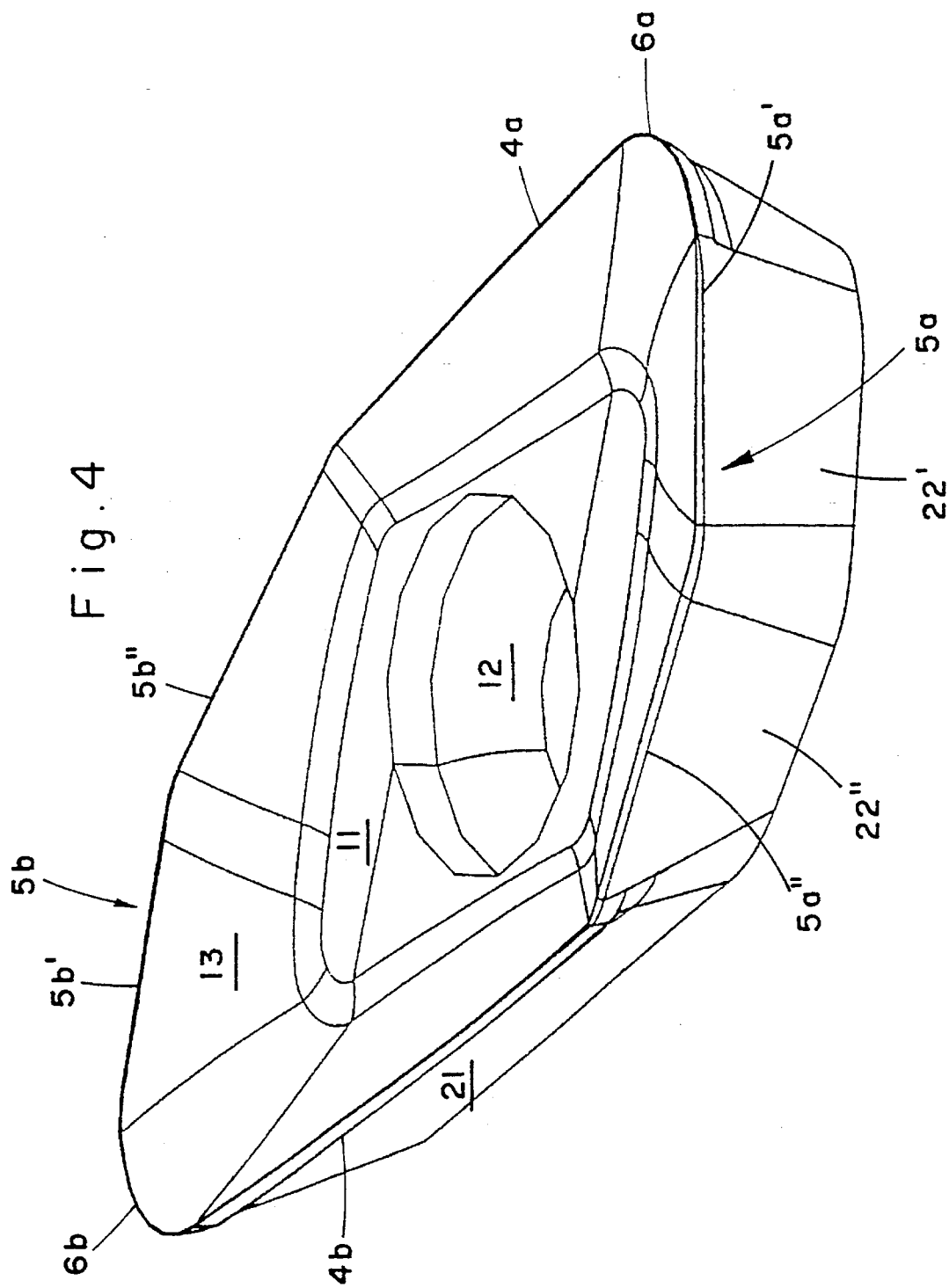
FIG. 4 is a perspective view of the cutting insert in accordance with the present invention.
Figure 6:
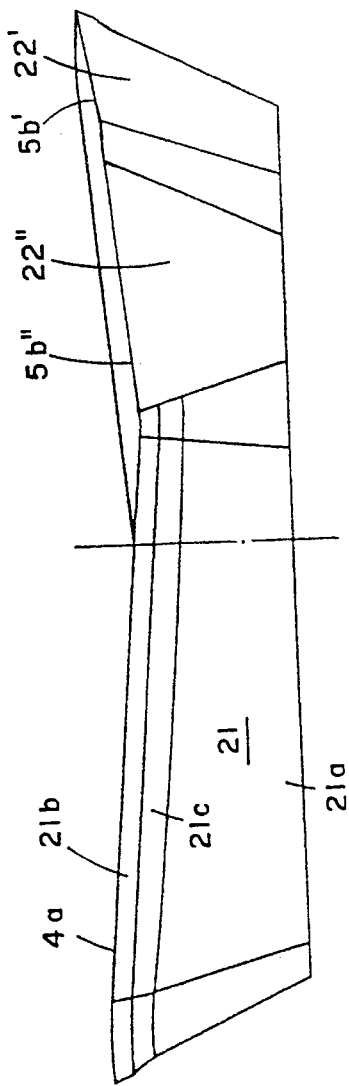
FIG. 6 is a side elevation of the cutting insert shown in FIG. 5.
Figure 5:
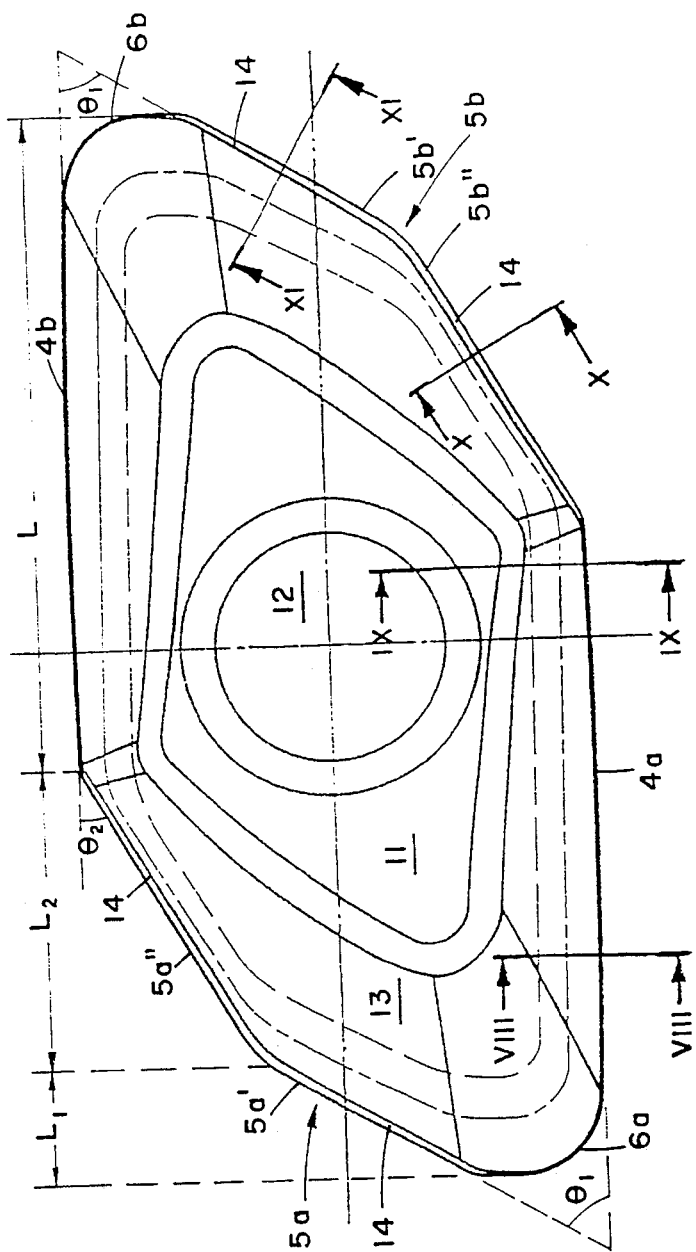
FIG. 5 is a plan view from above of the cutting insert shown in FIG. 4.
Figure 7:
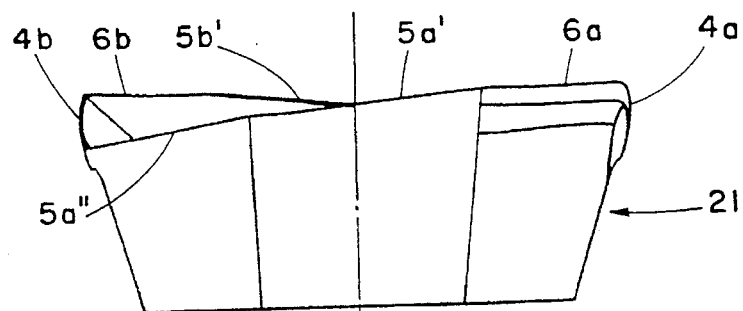
FIG. 7 is an end elevation of the cutting insert shown in FIGS. 4, 5 and 6.

As seen in FIGS. 4, 5, 6 and 7, the insert is of basically parallelepipedal shape, having a pair of opposite, parallel major cutting edges 4a, 4b and a pair of transversely directed subsidiary cutting edges 5a and 5b respectively comprising pairs of successive component subsidiary cutting edges 5a', 5a" and 5b', 5b". The component cutting edge 5a' merges with the adjacent major cutting edge 4a via a rounded nose portion 6a and defines with the major cutting edge 4a a first acute angle $\theta_1$. The component subsidiary cutting edge 5a" merges with the major cutting edge 4b and defines therewith an acute angle $\theta_2$. Similarly, the component subsidiary cutting edge 5b' merges with the major cutting edge 4b via a rounded nose portion 6b and defines therewith an acute angle $\theta_1$, whilst the component cutting edge 5b" merges with the major cutting edge 4a and defines therewith an acute angle $\theta_2$. Preferably, $\theta_1$ can range between 50° and 70°, whilst $\theta_2$ ranges between 20° and 40°. Preferred values for $\theta_1$ and $\theta_2$ are 60° and 30° respectively. As can be seen in FIG. 5 of the drawings, with a major cutting edge 4a, 4b having a length L, the component subsidiary cutting edges 5a', 5a" and 5b', 5b" have respective lengths $L_1$, $L_2$ as projected on their adjacent major cutting edges. $L_1+L_2$ is preferably equal to 0.6 L. As seen in FIG. 7, the subsidiary cutting edges slope progressively towards a base of the insert so that the component cutting edge 5a', 5b' defines a maximal height while the component cutting edge 5a", 5b" a minimal height of the subsidiary cutting edge 5a, 5b over the base.

As seen in FIGS. 4 and 5 of the drawings, the cutting insert in accordance with the invention is formed with an upper surface comprising a planar, central portion 11 having formed therein a through-going clamping bore 12 and being surrounded by a chip forming surface 13 which extends around the upper surface of the insert being bounded by the respective major and subsidiary cutting edges. Preferably the surface 13 is polished, thereby minimizing or avoiding an edge build up during operation.

There will now be described, with reference to FIGS. 8, 9, 10 and 11 of the drawings, the construction of rake surfaces and relief flanks associated with the cutting edges of the cutting insert. This description will be restricted to the surfaces associated with the major cutting edge 4a and component cutting edges 5b', 5b", it being understood that the rake surfaces and relief flanks associated with the other cutting edges of the insert are of identical construction.

Figure 8:
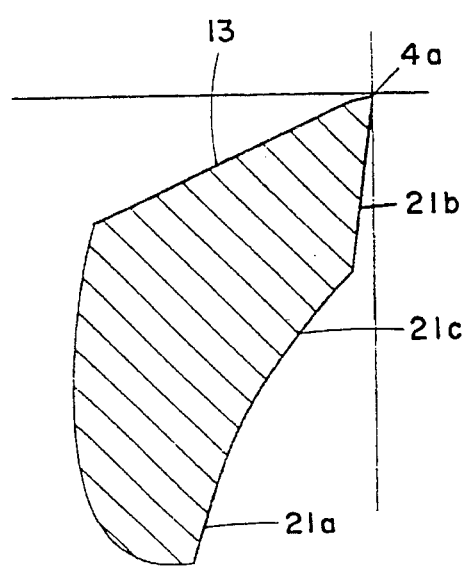
FIGS. 8, 9, 10 and 11 are respective cross-sectional views of the cutting insert shown in FIG. 5, taken along the lines VIII:VIII, IX:IX, X:X and XI:XI.
Figure 9:
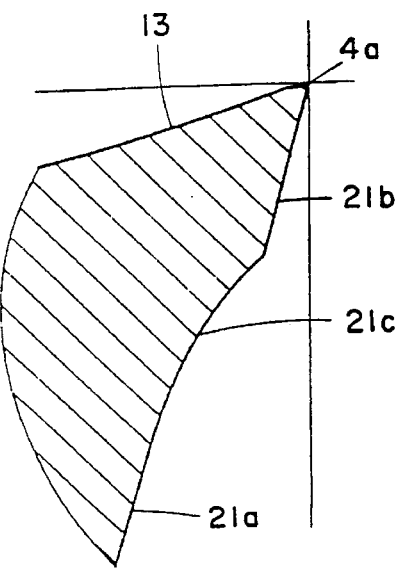

With reference to FIGS. 8 and 9, the rake surface associated with major cutting edge 4a is curved and defines a radial rake angle which varies along the length of the major cutting edge 4a so as to ensure that, when measured on the tool, the radial rake angle remains substantially constant along the length of the major cutting edge. A relief flank 21 associated with the major cutting edge 4a, as well as with the adjacent rounded nose portion 6a, comprises a lower, substantially planar component relief flank 21a, an upper, slightly projecting component relief flank 21b and a bridging portion 21c. The projecting portion 21b is, preferably, ground so as, on the one hand, to ensure the provision of a sharp cutting edge and, on the other hand, to have a substantially helically curved shape which ensures that, when mounted on the tool, the relief angle of these surfaces when measured with respect to the tool remains substantially constant along the length of the respective cutting edges.

Figure 11:
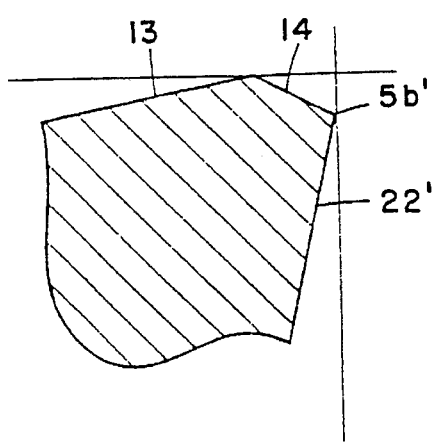
Figure 10:
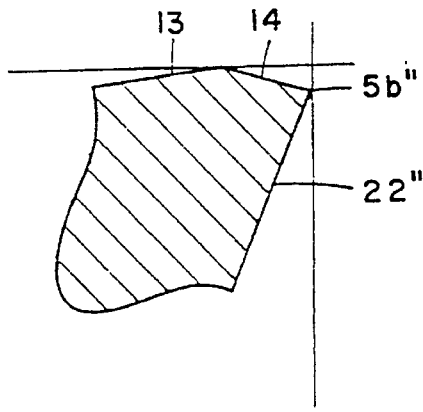

As clearly seen in FIGS. 10 and 11 of the drawings, the rake surfaces of the component cutting edges 5b' and 5b" comprise negative land surfaces 14 designed to afford reinforcement and greater protection to these component cutting edges which, in view of the fact that they are internally disposed (and therefore rotate at substantially lower peripheral cutting speeds than the outer, major cutting edges), are more subjected to frictional abrasion and suffer greater strains during the various cutting operations. As seen in the drawings, a land surface angle associated with the component cutting edge 5b' is greater than that associated with the component cutting edge 5b". Relief flanks 22' and 22" associated with the component subsidiary cutting edges 5b' and 5b" are planar. It should be mentioned that the relief flanks 22' and 22" may be formed, similarly to the relief flank surface 21 of the major cutting edge 4a, with component upper and lower relief flank portions.

As seen in FIG. 1, the insert 3 designed in accordance with the present invention, is mounted in the cutter tool 1 so as to be offset with respect to the longitudinal rotary axis 4 of the tool. The insert is mounted so that the major cutting edge of the insert is substantially co-directional with the rotary axis 4 forming a peripheral cutting edge. The major cutting edge 4a defines a positive axial rake angle $\gamma_A$ with respect to a longitudinal rotary axis 4 of the tool (FIG. 2) and the subsidiary cutting edge is oriented substantially radially with respect to the rotary axis 4 forming a frontal cutting edge, the innermost component subsidiary cutting edge substantially coinciding with a direction of radius of rotation and at least the outermost component subsidiary cutting edge being disposed substantially above a plane in which the rotary axis 4 of the tool lies (FIG. 3). Due to the specific manner of the positioning of the insert and, particularly the fact that the major portion of the subsidiary cutting edge is disposed above the plane in which the rotary axis of the tool lies, a portion of the cutter tool located below the seating supporting the insert has a relatively great mass and, consequently, is of a substantially high stiffness ensuring thereby that, during the cutting operation, vibrations are low.

As a consequence of the offset position of the cutting insert, during a sinking operation, an upstanding core is left in the workpiece surrounded by an annular groove, this core having a height corresponding to the degree of projection of the insert beyond the leading end of the tool. The core is removed in a transversely directed milling operation.

Figure 13:
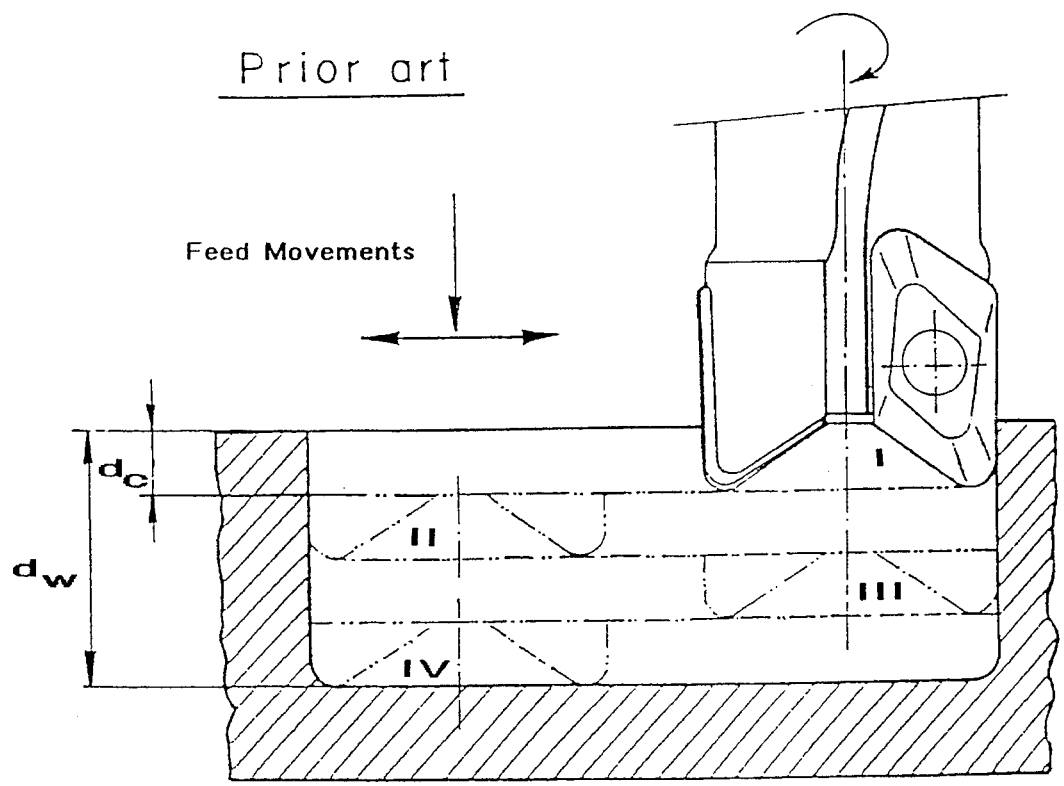
FIG. 13 schematically illustrates the corresponding use of a routing cutter tool incorporating a known insert in a corresponding pocketing operation.
Figure 12:
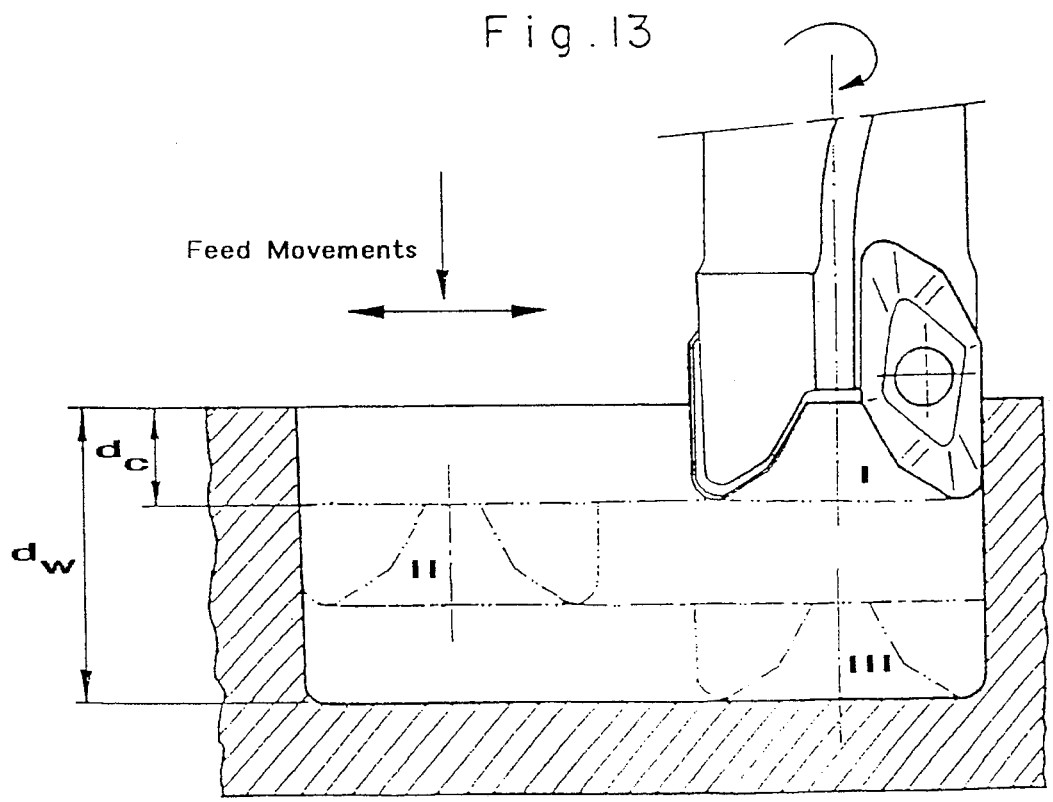
FIG. 12 schematically illustrates the use of the routing cutter tool shown in FIGS. 1, 2 and 3 and incorporating an insert in accordance with the present invention, in pocketing.

With reference to FIG. 12, it will now be seen that, with the cutting insert, according to the present invention and as just described, the maximum penetration depth $d_c$ of the insert during the sinking operation is now determined by the sum of the projected lengths $L_1$ and $L_2$, which sum is significantly greater than the projected length of the unitary subsidiary cutting edge of the prior art insert shown in FIG. 13 of the drawings. By virtue of this, with the use of a routing cutting tool having inserts in accordance with the present invention, for slotting a recess having a depth $d_w$, the depth of penetration for each transverse milling cycle dc is substantially equal to the total projected lengths $L_1$ and $L_2$ of the component subsidiary cutting edge and the slotting can be thereby effected with a lesser number (three) of transverse milling cycles as compared with that (four) required to produce the same depth of slot $d_w$ using known cutting inserts.

It will be appreciated that the above described positioning of the insert in the cutter tool, in particular the specific orientation of the innermost subsidiary component cutting edge, and the construction of the rake and relief surfaces combined with the two cutting edge portions of the subsidiary cutting edges, ensure an easy, balanced penetration of the tool in the workpiece during the sinking stage and result in an upwardly directed chip flow which, of course, is conducive to easier chip evacuation. Furthermore, the provision of the relief flank and rake surfaces with the helical curved shape and the consequent ensuring of substantially constant relief flank and radial rake angles along the lengths of the associated cutting edges when measured on the tool, results in favorable cutting conditions in terms of consistency of load and therefore improves tool life.

Whilst in the embodiment specifically described above each subsidiary cutting edge comprises two component cutting edges, the invention is equally applicable where each subsidiary component cutting edge comprises more than two, such as, for example, three component cutting edges.

It should be also mentioned that the cutting insert of the present invention does not need to be necessarily mounted in the offset position with respect to the rotary axis of the tool but it can rather be positioned in the tool so that its subsidiary cutting edge intersects the rotary axis of the tool, the innermost component cutting edge being directed substantially along the radius of rotation, enabling thereby drilling operations. Such an embodiment is particularly suitable for milling cutter tools of relatively small cutting diameters.

We claim:

1. A cutting insert for a rotary cutter tool having a rotary axis, said insert being of substantially parallelepipedal shape, having a pair of opposite, parallel, major cutting edges of length L and a pair of opposite subsidiary cutting edges, each subsidiary cutting edge being transversely directed with respect to the major cutting edges and comprising at least two successive, angularly disposed, component subsidiary cutting edges, a first component cutting edge of each subsidiary cutting edge merging, via a rounded nose portion, with an adjacent end of a major cutting edge and defining therewith an angle $\theta_1$ lying between 50°–70°, a further component cutting edge of each subsidiary cutting edge merging with an adjacent end of an opposite major cutting edge and defining therewith an angle $\theta_2$ lying between 20°–40°; the total projected length of the component subsidiary cutting edges of each subsidiary cutting edge being approximately 0.6 L, wherein the insert is further adapted to be seated on said tool such that the projected length of each subsidiary cutting edge on an adjacent major cutting edge of the insert defines, during a cutting operation, the maximal penetration depth of the tool in the direction along the rotary axis.

2. A cutting insert according to claim 1, wherein each subsidiary cutting edge comprises two component subsidiary cutting edges.

3. A cutting insert according to claim 2, wherein $\theta_1$ is substantially equal to 60° and $\theta_2$ is substantially equal to 30°.

4. A cutting insert for a rotary cutter tool, said insert being of substantially parallelepipedal shape, having a pair of opposite, parallel, major cutting edges of length L and a pair of opposite subsidiary cutting edges, each subsidiary cutting edge being transversely directed with respect to the major cutting edges and comprising at least two successive, angularly disposed, component subsidiary cutting edges, a first component cutting edge of each subsidiary cutting edge merging, via a rounded nose portion, with an adjacent end of a major cutting edge and defining therewith an angle $\theta_1$ lying between 50°–70°, a further component cutting edge of each subsidiary cutting edge merging with an adjacent end of an opposite major cutting edge and defining therewith an angle $\theta_2$ lying between 20°–40°; the total projected length of the component subsidiary cutting edges of each subsidiary cutting edge being approximately 0.61 L, wherein the component cutting edges are respectively associated with negative land surfaces.

5. A cutting insert according to claim 1, wherein relief flank surfaces associated with the major cutting edges are formed with lower, substantially planar portions and upper, substantially curved portions such that, when measured on the tool a relief flank angle is substantially constant along the length of the cutting edge.

6. A cutting insert according to claim 1, wherein relief flank surfaces associated with the subsidiary cutting edges are planar.

7. A cutting insert according to claim 6, wherein said relief flank surface associated with each subsidiary cutting edge comprises lower and upper portions.

8. A cutting insert according to claim 7, wherein said relief flank surface associated with each subsidiary cutting edge comprises an upper portion and a plurality of lower portions.

9. A cutting insert according to claim 5 or 8, wherein said upper portion of the relief flank surface projects beyond the respectively associated lower portions.

10. A cutting insert according to claim 1, wherein rake surfaces associated with said major cutting edges have such a shape that radial rake angles defined thereby vary along the length of the major cutting edges in such a manner that, when measured on the tool, the radial rake angle is substantially constant along the length of the major cutting edge.

11. A cutting insert for a rotary cutter tool having a longitudinal rotary cutting axis, said insert being of substantially parallelepipedal shape, having a pair of opposite peripheral cutting edges of length L and a pair of opposite frontal cutting edges, each frontal cutting edge being transversely directed with respect to the peripheral cutting edges and comprising at least two successive, angularly disposed, component cutting edges, a first component cutting edge of each frontal cutting edge merging, via a rounded nose portion, with an adjacent end of a peripheral cutting edge and defining therewith an angle $\theta_1$ lying between 50°–70°, a further component cutting edge of each frontal cutting edge merging with an adjacent end of an opposite peripheral cutting edge and defining therewith an angle $\theta_2$ lying between 20°–40°, the total projected length of the component cutting edges of each frontal cutting edge being approximately 0.6 L, wherein said insert is further adapted to be seated on said tool such that the insert's operative peripheral cutting edge is substantially co-directional with said axis and its operative frontal cutting edge is directed transversely to said axis.

12. A cutting tool comprising:

a tool holder having a longitudinal rotary cutting axis and at least one seating at a leading end thereof; and a cutting insert mounted in said at least one seating, said cutting insert having a pair of opposite, parallel, major cutting edges of length L, said major cutting edges being co-directional with said axis; and a pair of opposite subsidiary cutting edges being transversely directed with respect to the major cutting edges and comprising at least two successive, angularly disposed, component cutting edges, a first component cutting edge of each subsidiary cutting edge merging, via a rounded nose portion, with an adjacent end of a major cutting edge and defining therewith an angle $\theta_1$ lying between 50°–70°, a second component cutting edge of each subsidiary cutting edge merging with an adjacent end of an opposite major cutting edge and defining therewith an angle $\theta_2$ lying between 20°–40°, the total projected length of the component cutting edges of each subsidiary cutting edge being approximately 0.6 L, said projected length defining, during a cutting operation, the maximal penetration depth of the tool in the direction along said axis.

13. The cutting tool of claim 12 wherein the number of seatings is two and each seating has a cutting insert mounted therein.

* * * * *